(12) United States Patent
Chuang et al.

(10) Patent No.: US 12,331,458 B2
(45) Date of Patent: Jun. 17, 2025

(54) METHOD FOR DECOLORIZING POLYESTER FABRIC AND POLYESTER FABRIC

(71) Applicant: INDUSTRIAL TECHNOLOGY RESEARCH INSTITUTE, Hsinchu (TW)

(72) Inventors: Chung-Yang Chuang, Hsinchu (TW); Chih-An Chen, Hsinchu (TW); Min-Yan Dong, Hsinchu (TW); Chang-Jung Chang, Taoyuan (TW); Hui-Min Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 198 days.

(21) Appl. No.: 18/302,873

(22) Filed: Apr. 19, 2023

(65) Prior Publication Data
US 2024/0209569 A1 Jun. 27, 2024

(30) Foreign Application Priority Data
Dec. 27, 2022 (TW) .................................. 111150069

(51) Int. Cl.
*D06P 5/13* (2006.01)
*C08J 7/02* (2006.01)
*D06P 3/52* (2006.01)

(52) U.S. Cl.
CPC .................. *D06P 5/131* (2013.01); *C08J 7/02* (2013.01); *D06P 3/52* (2013.01); *D06P 5/132* (2013.01); *Y02W 30/62* (2015.05)

(58) Field of Classification Search
None
See application file for complete search history.

(56) References Cited

U.S. PATENT DOCUMENTS

| 4,003,880 A | * | 1/1977 | Sidebotham ............ B29B 17/02 |
| | | | 528/495 |
| 4,003,881 A | | 1/1977 | Sidebotham et al. |
| 4,137,393 A | | 1/1979 | Sidebotham et al. |
| | | (Continued) | |

FOREIGN PATENT DOCUMENTS

| CA | 2 284 504 A1 | 1/2001 |
| CA | 2 476 774 A1 | 8/2003 |
| | (Continued) | |

OTHER PUBLICATIONS

Taiwanese Office Action and Search No. 111150069, dated Aug. 9, 2023.

*Primary Examiner* — Katie L. Hammer
(74) *Attorney, Agent, or Firm* — Birch, Stewart, Kolasch & Birch, LLP

(57) ABSTRACT

A method for decolorizing polyester fabric and a polyester fabric are provided. The method for decolorizing polyester fabric includes providing a dye-attached polyester fabric. The dye-attached polyester fabric is immersed in a first solution, obtaining a treated polyester fabric. The treated polyester fabric is immersed in a second solution, to obtain a decolorized polyester fabric. The first solution includes water, a first swelling agent and a solubility promoter. The second solution includes water, a second swelling agent, and an auxiliary swelling agent.

13 Claims, 1 Drawing Sheet

(56) References Cited

U.S. PATENT DOCUMENTS

| | | | |
|---|---|---|---|
| 6,083,283 A * | 7/2000 | Berkstresser, IV | C08J 7/02 528/495 |
| 7,947,750 B2 | 5/2011 | Ozer et al. | |
| 2005/0198742 A1 | 9/2005 | Berard et al. | |
| 2010/0281623 A1 | 11/2010 | Oshel et al. | |
| 2015/0059103 A1 | 3/2015 | Lu et al. | |
| 2018/0171539 A1 | 6/2018 | Hinks et al. | |
| 2018/0209089 A1 | 7/2018 | Hinks et al. | |
| 2018/0216283 A1 | 8/2018 | Bokka et al. | |
| 2020/0270790 A1 | 8/2020 | Lao et al. | |
| 2020/0270807 A1 | 8/2020 | Keh et al. | |
| 2022/0169786 A1 | 6/2022 | Takao et al. | |
| 2022/0204720 A1 | 6/2022 | Chang et al. | |

FOREIGN PATENT DOCUMENTS

| | | | | |
|---|---|---|---|---|
| CN | 101675102 B | 5/2012 | | |
| CN | 103374144 A | 10/2013 | | |
| CN | 104420191 A | 3/2015 | | |
| CN | 108641120 A | 10/2018 | | |
| CN | 110117224 A | 8/2019 | | |
| CN | 110204781 A | 9/2019 | | |
| CN | 106748649 B | 10/2019 | | |
| CN | 110387759 A | 10/2019 | | |
| CN | 108138436 B | 5/2020 | | |
| CN | 111607956 A | 9/2020 | | |
| CN | 113508153 A | 10/2021 | | |
| EP | 4032947 A1 * | 7/2022 | | B29B 17/02 |
| EP | 4108709 A1 * | 12/2022 | | C08J 3/203 |
| JP | 2007-254904 A | 10/2007 | | |
| JP | 2009-68127 A | 4/2009 | | |
| JP | 2020-133089 A | 8/2020 | | |
| TW | I481762 B | 4/2015 | | |
| TW | 202104399 A | 2/2021 | | |
| TW | I750456 B | 12/2021 | | |
| TW | I757708 B | 3/2022 | | |
| TW | 202212444 A | 4/2022 | | |
| TW | I766511 B | 6/2022 | | |
| WO | WO 03/064752 A1 | 8/2003 | | |
| WO | WO 2016/012755 A1 | 1/2016 | | |
| WO | WO 2017/034873 A1 | 3/2017 | | |
| WO | WO 2017/053264 A1 | 3/2017 | | |

* cited by examiner

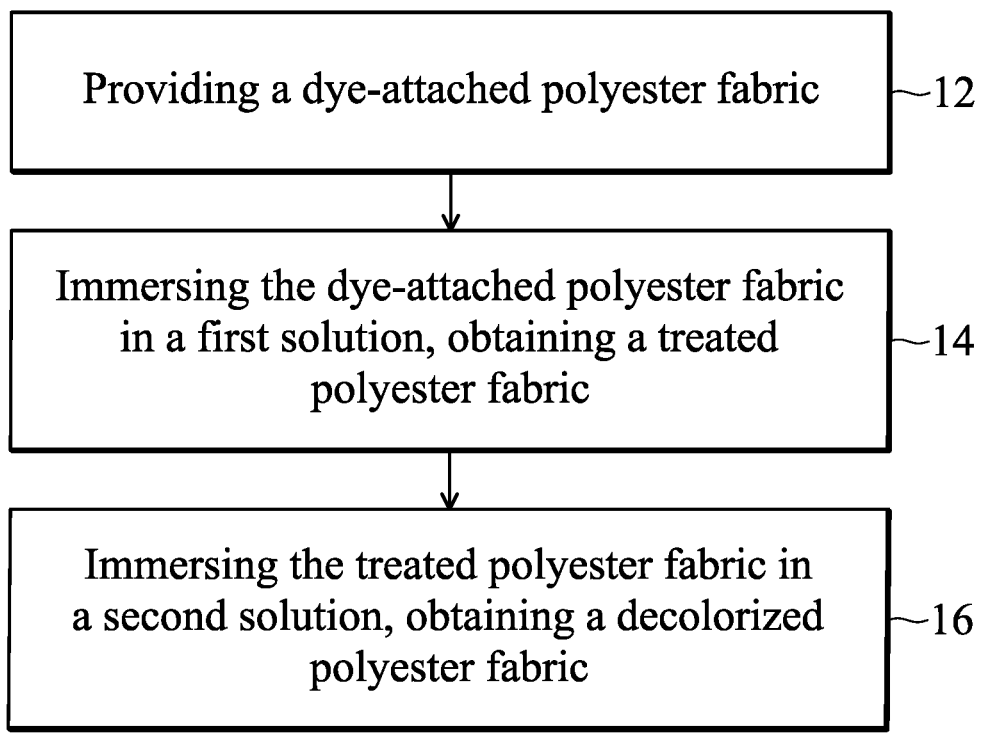

ME THOD FOR DECOLORIZING
POLYESTER FABRIC AND POLYESTER
FABRIC

CROSS REFERENCE TO RELATED APPLICATIONS

This application claims priority of Taiwan Patent Application No. 111150069, filed on Dec. 27, 2022, the entirety of which is incorporated by reference herein.

TECHNICAL FIELD

The disclosure relates to a method for decolorizing polyester fabric and a polyester fabric.

BACKGROUND

With the rise of environmental awareness, reusing industrial and commercial waste products has now become an important issue, and has created business opportunities for the affected industries. At present, the annual production of polyester products around the world is about 70 million tons. PET fabrics make up more than 70% of this total, and PET bottles represent less than 30%. However, only PET bottles can be recycled, with a complete recycling system devoted to them, while there is still a need for a feasible recycling mechanism for PET fabrics.

In general, the methods commonly used to decolorize polyester fabric include chemical oxidation-reduction decolorization. However, this method does not remove the dye from the polyester fabric, and the residual dye can easily cause thermal decomposition reactions and other side effects when the polyester fabric are treated further, resulting in a decrease in the purity of the polyester fabric and a deterioration of their physical properties.

SUMMARY

According to embodiments of the disclosure, the disclosure provides a method for decolorizing polyester fabric. The method for decolorizing polyester fabric including following steps. A dye-attached polyester fabric is provided. The dye-attached polyester fabric is immersed in a first solution, obtaining a treated polyester fabric. The treated polyester fabric is then immersed in the second solution, obtaining a decolorized polyester fabric. The first solution includes water, a first swelling agent, and a solubility promoter. The second solution includes water, a second swelling agent and an auxiliary swelling agent. According to embodiments of the disclosure, the first swelling agent may be $C_1$-$C_6$ aliphatic carboxylic acid, $C_7$-$C_{13}$ aromatic carboxylic acid, alkali metal hydroxide, alkaline earth metal hydroxide, or a combination thereof. the solubility promoter may be $R^1_4NCl$, peroxide, persulfate, cerium salt, chlorine-containing inorganic acid, chlorine-containing inorganic salt, or a combination thereof, wherein $R^1$ may be independently $C_1$-$C_6$ alkyl group, phenyl group, benzyl group, or phenethyl group. the second swelling agent may be $C_3$-$C_8$ aliphatic alcohol, $C_4$-$C_8$ aliphatic ketone, $C_8$-$C_{16}$ aromatic ketone, $C_6$-$C_{10}$ phenolic compound, or a combination thereof, and the auxiliary swelling agent may be ethylene carbonate, propylene carbonate, dimethyl acetamide, dimethyl formamide, dimethyl sulfoxide, ethyl acetate, tetrahydrofuran, dihydrolevoglucosenone, or a combination thereof.

According to embodiments of the disclosure, the disclosure also provides a polyester fabric, wherein the polyester fabric is a decolorized polyester fabric prepared by subjecting a dye-attached polyester fabric to the method for decolorizing polyester fabric of the disclosure.

BRIEF DESCRIPTION OF THE DRAWINGS

FIGURE is a flow chart illustrating the method 10 for decolorizing polyester fabric according to an embodiment of the disclosure.

DETAILED DESCRIPTION OF DISCLOSED EMBODIMENTS

The method for decolorizing polyester fabric and the polyester fabric are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art.

Moreover, the use of ordinal terms such as "first", "second", "third", etc., in the disclosure to modify an element does not by itself connote any priority, precedence, or der of one claim element over another or the temporal order in which it is formed, but are used merely as labels to distinguish one claim element having a certain name from another element having the same name (but for use of the ordinal term) to distinguish the claim elements.

The disclosure provides a method for decolorizing polyester fabric and a polyester fabric. According to embodiments of the disclosure, the method for decolorizing polyester fabric of the disclosure is a two-stage immersion process. In the first stage, a combination of a first swelling agent and a solubility promoter is used, so that the solubility of the dye in an aqueous solution can be improved. In the second stage, a combination of a second swelling agent and an auxiliary swelling agent is used, so that the non-crystalline region of the polyester is swelled, allowing the dye in the non-crystalline region of the polyester to further dissolve in the aqueous solution. The method for decolorizing polyester fabric of the disclosure can effectively remove the dye attached to the polyester fabric without using pressurized equipment, achieve the purpose of deep decolorization of the polyester fabric, and improve the reusability of polyester fabrics.

Accordingly, the method for decolorizing polyester fabric of the disclosure can effectively solve the current problem that the recycled polyester has poor physical properties and cannot be reused due to the low decolorization rate. In addition, in comparison with the current method for decolorizing polyester fabric by means of organic solvent extraction, the method for decolorizing polyester fabric of the disclosure can be decolorized by aqueous solution and has the advantages of high decolorization rate, low pollution, low reaction temperature, and reusable treatment agent, thereby achieving the purpose of environmental protection and waste reduction According to embodiments of the disclosure, the disclosure provides a method for decolorizing polyester fabric. As shown in FIGURE, the method for decolorizing polyester fabric of the disclosure 10 include following steps. First, a dye-attached polyester fabric is provided (steps 12). Next, the dye-attached polyester fabric is immersed in a first solution, obtaining a treated polyester fabric (steps 14). Next, the treated polyester fabric is immersed in the second solution, obtaining a decolorized polyester fabric (steps 16). It should be noted that the disclosure method for decolorizing polyester fabric employs the first solution to increase the solubility of dye and employs the second solution to dissolve the dye in immersion process. If the order of the use of the first solution and second solution is reversed, the dissolution efficiency of dye will be poorer due to the low dye solubility, thereby reducing the decolorization rate. As a result, the effect is comparable to merely using the second solution for immersion process.

According to embodiments of the disclosure, the dye attached to the polyester fabric is not limited and may be a dispersed dye. According to embodiments of the disclosure, the polyester of the disclosure is a linear (or quasi-linear) polymer (such as polyethylene terephthalate (PET), polybutylene terephthalate (PBT), or polytrimethylene terephthalate (PTT)) produced by polycondensation reaction of dioic acid and dihydric alcohol. Polyester may be further processed into polyester fiber. The polyester fabric of the disclosure means a fabric prepared from the polyester fiber.

According to embodiments of the disclosure, the first solution is an aqueous solution. According to embodiments of the disclosure, the first solution includes water, a first swelling agent, and a solubility promoter. According to some embodiments of the disclosure, the first solution may consist of water, the first swelling agent, and the solubility promoter. According to embodiments of the disclosure, the first solution includes 20 wt % to 60 wt % (such as 25 wt %, 30 wt %, 35 wt %, 40 wt %, 45 wt %, 50 wt %, or 55 wt %) of water, 1 wt % to 60 wt % (such as 2 wt %, 3 wt %, 5 wt %, 10 wt %, 15 wt %, 20 wt %, 25 wt %, 30 wt %, 35 wt %, 40 wt %, 45 wt %, 50 wt %, or 55 wt %) of the first swelling agent, and 0.1 wt % to 20 wt % (such as 0.5 wt %, 1 wt %, 2 wt %, 3 wt %, 5 wt %, 10 wt %, or 15 wt %) of the solubility promoter, based on the total weight of the first solution.

According to embodiments of the disclosure, when the amount of the first swelling agent is too high, the physical properties of polyester fabric would be deteriorated. When the amount of the first swelling agent is too low, the swelling effect would be poor. According to embodiments of the disclosure, when the amount of solubility promoter is too high, the physical properties of polyester fabric would be deteriorated. When the amount of solubility promoter is too low, the dye dissolution would be reduced.

According to embodiments of the disclosure, the first swelling agent may be $C_1$-$C_6$ aliphatic carboxylic acid, $C_7$-$C_{13}$ aromatic carboxylic acid, alkali metal hydroxide, alkaline earth metal hydroxide, or a combination thereof.

According to embodiments of the disclosure, $C_1$-$C_6$ aliphatic carboxylic acid may be formic acid, acetic acid, propanoic acid, butyric acid, pentanoic acid, hexanoic acid, isomer thereof, or a combination thereof.

According to embodiments of the disclosure, $C_7$-$C_{13}$ aromatic carboxylic acid may be benzoic acid, toluic acid, cumic acid, 2,3-dimethylbenzoic acid, 3,5-dimethylbenzoic acid, phthalic acid, isophthalic acid, terephthalic acid, phenyl acetic acid, hydrocinnamic acid, phenyl succinic acid, or a combination thereof.

According to embodiments of the disclosure, alkali metal hydroxide may be sodium hydroxide, potassium hydroxide, or a combination thereof.

According to embodiments of the disclosure, alkaline earth metal hydroxide may be magnesium hydroxide, calcium hydroxide, or a combination thereof.

According to embodiments of the disclosure, the solubility promoter may be quaternary ammonium compound (such as $R^1_4NCl$, wherein $R^1$ may be independently $C_1$-$C_6$ alkyl group, phenyl group, benzyl group or phenethyl group), peroxide, persulfate, cerium salt, chlorine-containing inorganic acid, chlorine-containing inorganic salt, or a combination thereof. According to embodiments of the disclosure, $C_1$-$C_6$ alkyl group may be linear or branched alkyl group. for example, $C_1$-$C_6$ alkyl group may be methyl, ethyl, propyl, butyl, pentyl, hexyl, or an isomer thereof.

According to embodiments of the disclosure, quaternary ammonium compound (such as $R^1_4NCl$) may be tetrabutylammonium chloride, tetraethylammonium chloride, tetraethylammonium bromide, tetramethylammonium chloride, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, or a combination thereof.

According to embodiments of the disclosure, peroxide may be hydrogen peroxide, benzoyl peroxide, tert-butyl hydroperoxide, tert-butyl peroxide, tert-butyl peroxybenzoate, cyclohexanone peroxide, or a combination thereof.

According to embodiments of the disclosure, persulfate may be sodium persulfate, potassium persulfate, ammonium persulfate, or a combination thereof.

According to embodiments of the disclosure, cerium salt may be cerium nitrate, cerium acetylacetonate, cerium carbonate, cerium oxalate, cerium sulfate, or a combination thereof.

According to embodiments of the disclosure, chlorine-containing inorganic acid may be chloric acid, chlorous acid, hypochlorous acid, perchloric acid, or a combination thereof.

According to embodiments of the disclosure, chlorine-containing inorganic salt may be sodium chlorate, sodium chlorite, sodium hypochlorite, sodium perchlorate, sodium chlorate, sodium chlorite, sodium hypochlorite, potassium perchlorate, or a combination thereof.

According to embodiments of the disclosure, the second solution is an aqueous solution. According to embodiments of the disclosure, the second solution includes water, a second swelling agent, and an auxiliary swelling agent. According to some embodiments of the disclosure, the second solution may consist of water, the second swelling agent and the auxiliary swelling agent. According to embodiments of the disclosure, the second solution includes about 40 wt % to 90 wt % of water (such as 25 wt %, 30 wt %, 35 wt %, 40 wt %, 45 wt %, 50 wt %, or 55 wt %), 1 wt % to 30 wt % of the second swelling agent (such as 2 wt %, 3 wt %, 5 wt %, 10 wt %, 15 wt %, 20 wt %, or 25 wt %), and 1 wt % to 30 wt % (such as 2 wt %, 3 wt %, 5 wt %, 10 wt %, 15 wt %, 20 wt %, or 25 wt %) of the auxiliary swelling agent, based on the total weight of the second solution.

According to embodiments of the disclosure, when the amount of second swelling agent is too high, the physical properties of polyester fabric would be deteriorated. When the amount of second swelling agent is too low, the swelling effect would be poor. According to embodiments of the disclosure, when the amount of auxiliary swelling agent is too high, the cost would be increased. When the amount of auxiliary swelling agent is too low, the swelling effect would not be effectively promoted.

According to embodiments of the disclosure, the second swelling agent may be $C_3$-$C_8$ aliphatic alcohol, $C_4$-$C_8$ aliphatic ketone, $C_8$-$C_{16}$ aromatic ketone, $C_6$-$C_{10}$ phenolic compound, or a combination thereof.

According to embodiments of the disclosure, $C_3$-$C_8$ aliphatic alcohol may be propanol, butanol, pentanol, hexanol, heptanol, octanol, nonanol, diethylene glycol, triethylene glycol, propanediol, butanediol, pentanediol, hexanetriol, or a combination thereof.

According to embodiments of the disclosure, $C_4$-$C_8$ aliphatic ketone may be butanone, pentanone, hexanone, cyclohexanone, methylcyclohexanone, heptanone, octanone, or a combination thereof.

According to embodiments of the disclosure, $C_8$-$C_{16}$ aromatic ketone may be benzophenone, acetophenone, propiophenone, 3,4-dimethoxy-1-acetophenone, or a combination thereof.

According to embodiments of the disclosure, $C_6$-$C_{10}$ phenolic compound may be phenol, o-cresol, m-cresol, p-cresol, or a combination thereof.

According to embodiments of the disclosure, the auxiliary swelling agent may be ethylene carbonate, propylene carbonate, dimethyl acetamide, dimethyl formamide, dimethyl sulfoxide, ethyl acetate, tetrahydrofuran, dihydrolevoglucosenone, or a combination thereof. According to embodiments of the disclosure, the dye-attached polyester fabric may be immersed in the first solution at a temperature. According to embodiments of the disclosure, the temperature may be greater than or equal to the glass transition temperature of the polyester fabric. According to embodiments of the disclosure, the temperature may be about 80° C. to 150° C. (such as 80° C., 85° C., 90° C., 95° C., 100° C., 105° C., 110° C., 115° C., 120° ° C., 125° C., 130° C., 135° C., 140° C., or 145° C.). According to embodiments of the disclosure, the dye-attached polyester fabric is immersed in the first solution at 80° C. to 120° C. As a result, within the range of the temperature, the first solution (including the first swelling agent and the solubility promoter) can improve the dye solubility in the aqueous solution and reduce energy loss.

The time period for immersing the dye-attached polyester fabric in the first solution impregnation may be about 10 minutes to 4 hours (such as 20 minutes, 30 minutes, 40 minutes, 50 minutes, 1 hour, 2 hours or 3 hours).

According to embodiments of the disclosure, after immersing the dye-attached polyester fabric immersed in the first solution, the obtained treated polyester fabric may be directly immersed in the second solution. According to embodiments of the disclosure, after immersing the dye-attached polyester fabric immersed in the first solution, the obtained treated polyester fabric may be subjected to a cleaning process before immersing in the second solution.

According to embodiments of the disclosure, the treated polyester fabric may be immersed in the second solution at a temperature. According to embodiments of the disclosure, the temperature may be greater than or equal to the glass transition temperature of the polyester fabric. According to embodiments of the disclosure, the temperature may be about 80° C. to 150° C. (such as 80° C., 85° C., 90° C., 95° C., 100° C., 105° C., 110° C., 115° C., 120° C., 125° C., 130° C., 135° C., 140° C., or 145° C.). According to embodiments of the disclosure, the treated polyester fabric may be immersed in the second solution at 80° C. to 120° ° C. As a result, within the range of the temperature, the second solution (including the second swelling agent and the auxiliary swelling agent) may achieve the purpose of deep decolorization of polyester fabric, thereby effectively increasing the decolorization rate and reduce energy loss.

The time period for immersing the dye-attached polyester fabric in the second solution impregnation may be about 10 minutes to 4 hours (such as 20 minutes, 30 minutes, 40 minutes, 50 minutes, 1 hour, 2 hours or 3 hours).

According to embodiments of the disclosure, the decolorized polyester fabric prepared from the method for decolorizing polyester fabric of the disclosure has a decolorization rate of about 90% to 99% (such as 91%, 92%, 93%, 94%, 95%, 96%, 97%, or 98%). The decolorization rate of decolorized polyester fabric is determined by following steps. First, the K/S value ($V_1$) of the dye-attached polyester fabric is determined by spectrophotometer (X-rite i1Pro, USA) (with scanning wavelength of 400 nm to 700 nm). Next, the K/S value ($V_2$) of the decolorized polyester fabric prepared from the method for decolorizing polyester fabric of the disclosure is determined by spectrophotometer. Next, the decolorization rate (D) is determined $D=[(V_1-V_2)/V1 \times 100\%]$.

According to embodiments of the disclosure, the disclosure provides a polyester fabric. The polyester fabric may be the decolorized polyester fabric prepared by subjecting a dye-attached polyester fabric to the method for decolorizing polyester fabric of the disclosure.

According to embodiments of the disclosure, the decolorized polyester fabric prepared from the method for decolorizing polyester fabric of the disclosure has an intrinsic viscosity of about 0.5 dL/g to 0.63 dL/g (such as about 0.51 dL/g, 0.52 dL/g, 0.53 dL/g, 0.54 dL/g, 0.55 dL/g, 0.56 dL/g, 0.57 dL/g, 0.58 dL/g, 0.59 dL/g, 0.60 dL/g, 0.61 dL/g or 0.62 dL/g). According to embodiments of the disclosure, the intrinsic viscosity of polyester fabric is determined by following steps. First, a solution (with a concentration of 0.3 g/dL) is prepared by dissolving the polyester fabric with a co-solvent (phenol and tetrachloroethane, wherein the volume ratio of the phenol to tetrachloroethane is 6:4). Next, the intrinsic viscosity of the solution is determined by Ostwald viscometer at 30° C.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE

Decolorization of Polyester Fabric

Example 1

Formic acid and potassium chlorate was dissolved in deionized water, obtaining First solution (1). In First solution (1), the concentration of formic acid was 50 wt % and the concentration of potassium chlorate was 0.1 wt %, based on the total weight of First solution (1). Cresol, propylene carbonate, polyethylene glycol p-(1,1,3,3-tetramethylbutyl)-phenyl ether (with a trade number of Triton X-100, commercially available from Emperor Chemical Co., Ltd.) (serving as a surfactant) were dissolved in deionized water, obtaining Second solution (1). In Second solution (1), the concentration of cresol was 10 wt %, the concentration of propylene carbonate is 10 wt %, and the concentration of polyethylene glycol p-(1,1,3,3-tetramethylbutyl)-phenyl ether is 0.1 wt %, based on the total weight of Second solution (1). Next, after heating First solution (1) to 95° C., Blue dye-attached polyester fabric (1) (wherein the dye was Blue 79, K/S value determined by spectrophotometer (X-rite i1Pro, USA) was 28.95) was immersed in First solution (1), wherein the weight ratio of Blue dye-attached polyester fabric (1) to First solution (1) was about 1:10. After stirring at 95° C. for 2 hours, the treated polyester fabric was isolated from First solution (1) and then the treated polyester fabric was immersed in Second solution (1), wherein the weight ratio of the polyester fabric treated by First solution (1) to Second solution (1) was about 1:10. After stirring at 95° C. for 2 hours, the polyester fabric was washed with deionized water. After drying, Polyester fabric (1) was obtained.

K/S value of Polyester fabric (1) was determined by spectrophotometer (Datacolor SF600, Switzerland) and K/S value of Polyester fabric (1) was 1.04. The decolorization rate and intrinsic viscosity (IV value) of Polyester fabric (1) were determined, and the results are shown in Table 1.

The intrinsic viscosity of polyester fabric was determined by following steps. First, a solution (with a concentration of 0.3 g/dL) was prepared by dissolving Polyester fabric (1) with a co-solvent (phenol and tetrachloroethane, wherein the volume ratio of the phenol to tetrachloroethane was 6:4). Next, the intrinsic viscosity of the solution was determined by Ostwald viscometer at 30° C.

Example 2

Example 2 was performed in the same manner as in Example 1 except that Blue dye-attached polyester fabric (1) was replaced with Blue dye-attached polyester fabric (2) (wherein the dye was Blue 60 with K/S value of 15.99), obtaining Polyester fabric (2).

K/S value of Polyester fabric (2) was determined by spectrophotometer (X-rite i1Pro, USA) and K/S value of Polyester fabric (2) was 0.67. The decolorization rate and intrinsic viscosity (IV value) of Polyester fabric (2) were determined, and the results are shown in Table 1.

Example 3

Example 3 was performed in the same manner as in Example 1 except that First solution (1) was replaced with First solution (2) (including 45 wt % of formic acid, 1 wt % of sodium hypochlorite and 54 wt % of water) and Second solution (1) was replaced with Second solution (2) (including 10 wt % of cresol, 10 wt % of ethylene carbonate, 0.1 wt % of Triton X-100 and 79.9 wt % of water), obtaining Polyester fabric (3).

K/S value of Polyester fabric (3) was determined by spectrophotometer (X-rite i1Pro, USA) and K/S value of Polyester fabric (3) was 1.3. The decolorization rate and intrinsic viscosity (IV value) of Polyester fabric (3) were determined, and the results are shown in Table 1.

Comparative Example 1

First solution (1) as disclosed in Example 1 was provided. Next, after heating First solution (1) to 95° C., Blue dye-attached polyester fabric (1) (wherein the dye was Blue 79, K/S value determined by spectrophotometer (X-rite i1Pro, USA) was 28.95) was immersed in First solution (1), wherein the weight ratio of Blue dye-attached polyester fabric (1) to First solution (1) was about 1:10. After stirring at 95° C. for 2 hours, the treated polyester fabric was isolated from First solution (1) and then washed with deionized water. After drying, Polyester fabric (4) was obtained.

K/S value of Polyester fabric (4) was determined by spectrophotometer (X-rite i1Pro, USA) and K/S value of Polyester fabric (4) was 5.79. The decolorization rate and intrinsic viscosity (IV value) of Polyester fabric (4) were determined, and the results are shown in Table 1.

Comparative Example 2

Second solution (1) as disclosed in Example 1 was provided. Next, after heating Second solution (1) to 95° C., Blue dye-attached polyester fabric (1) (wherein the dye was Blue 79, K/S value determined by spectrophotometer (X-rite i1Pro, USA) was 28.95) was immersed in Second solution (1), wherein the weight ratio of Blue dye-attached polyester fabric (1) to Second solution (1) was about 1:10. After stirring at 95° C. for 2 hours, the treated polyester fabric was isolated from Second solution (1) and then washed with deionized water. After drying, Polyester fabric (5) was obtained.

K/S value of Polyester fabric (5) was determined by spectrophotometer (X-rite i1Pro, USA) and K/S value of Polyester fabric (5) was 7.23. The decolorization rate and intrinsic viscosity (IV value) of Polyester fabric (5) were determined, and the results are shown in Table 1.

TABLE 1

| | first solution | second solution | dye | decolorization rate (%) | intrinsic viscosity (dL/g) |
|---|---|---|---|---|---|
| Example 1 | formic acid 50 wt %/potassium chlorate 0.1 wt % | cresol 10 wt %/ propylene carbonate 10 wt %/ TritonX-100 0.1 wt % | Blue 79 | 96.4% | 0.58 |
| Example 2 | formic acid 50 wt %/potassium chlorate 0.1 wt % | cresol 10 wt %/ propylene carbonate 10 wt %/ TritonX-100 0.1 wt % | Blue 60 | 95.8% | 0.58 |

TABLE 1-continued

|  | first solution | second solution | dye | decolorization rate (%) | intrinsic viscosity (dL/g) |
|---|---|---|---|---|---|
| Example 3 | formic acid 45 wt %/sodium hypochlorite 1 wt % | cresol 10 wt %/ ethylene carbonate 10 wt %/ TritonX-100 0.1 wt % | Blue 79 | 95.5% | 0.58 |
| Comparative Example 1 | formic acid 50 wt %/potassium chlorate 0.1 wt % formic acid | — | Blue 79 | 80% | 0.58 |
| Comparative Example 2 | — | cresol 10 wt %/ propylene carbonate 10 wt %/ TritonX-100 0.1 wt % | Blue 79 | 75% | 0.58 |

Comparative Example 1 merely uses the first solution to decolorize the blue polyester fabric, and Comparative Example 2 merely uses the second solution to decolorize the blue polyester fabric. As shown in Table 1, the decolorization rate of the decolorized polyester fabric as disclosed in Comparative Examples 1 and 2 is less than or equal to 80%. In comparison with Comparative Examples 1 and 2, the polyester fabric prepared from the two-stage decolorization method employing the first solution and second solution of the disclosure (i.e. polyester fabric of Examples 1-3) has an obviously increased decolorization rate (more than 95%).

Example 4

Example 4 was performed in the same manner as in Example 1 except that First solution (1) was replaced with First solution (2) (including 45 wt % of formic acid, 1 wt % of sodium hypochlorite and 54 wt % of water) and Second solution (1) was replaced with Second solution (3) (including 10 wt % of butanone, 10 wt % of dihydrolevoglucosenone and 80 wt % of water), obtaining Polyester fabric (6).

K/S value of Polyester fabric (6) was determined by spectrophotometer (X-rite i1Pro, USA) and K/S value of Polyester fabric (6) was 1.53. The decolorization rate and intrinsic viscosity (IV value) of Polyester fabric (6) were determined, and the results are shown in Table 2.

Comparative Example 3

Second solution (4) was provided, wherein Second solution (4) included 10 wt % of butanone, 10 wt % of propylene carbonate and 80 wt % of water. Next, after heating Second solution (4) to 95° C., Blue dye-attached polyester fabric (1) (wherein the dye was Blue 79 and K/S value was 28.95) was immersed in Second solution (4), wherein the weight ratio of Blue dye-attached polyester fabric (1) to Second solution (4) was about 1:10. After stirring at 95° C. for 2 hours, the treated polyester fabric was isolated from Second solution (4) and then washed with deionized water. After drying, Polyester fabric (7) was obtained.

K/S value of Polyester fabric (7) was determined by spectrophotometer (X-rite i1Pro, USA) and K/S value of Polyester fabric (7) was 10.71. The decolorization rate and intrinsic viscosity (IV value) of Polyester fabric (7) were determined, and the results are shown in Table 2.

TABLE 2

|  | first solution | second solution | dye | decolorization rate (%) | intrinsic viscosity (dL/g) |
|---|---|---|---|---|---|
| Example 4 | formic acid 45 wt %/sodium hypochlorite 1 wt % | methyl ethyl ketone (MEK) 10 wt %/ dihydrolevoglucosenone 10 wt % | Blue 79 | 94.7% | 0.58 |
| Comparative Example 3 | — | methyl ethyl ketone (MEK) 10 wt %/propylene carbonate 10 wt % | Blue 79 | 63% | 0.58 |

Comparative Example 3 merely uses the second solution to decolorize the blue polyester fabric. As shown in Table 2, the decolorization rate of the decolorized polyester fabric as disclosed in Comparative Example 3 is about 63%. In comparison with Comparative Example 3, the polyester fabric prepared from the two-stage decolorization method employing the first solution and second solution of the disclosure (i.e. polyester fabric of Example 4) has an obviously increased decolorization rate (more than 94%).

Example 5

Example 5 was performed in the same manner as in Example 1 except that First solution (1) was replaced with First solution (3) (including 0.3 wt % of benzyltributylammonium chloride, 1 wt % of sodium hydroxide, 3 wt % of hydrogen peroxide, and 95.7 wt % of water), obtaining Polyester fabric (8).

K/S value of Polyester fabric (8) was determined by spectrophotometer (X-rite i1Pro, USA) and K/S value of Polyester fabric (8) was 2.75. The decolorization rate and intrinsic viscosity (IV value) of Polyester fabric (8) were determined, and the results are shown in Table 3.

Comparative Example 4

First solution (3) as disclosed in Example 5 was provided. Next, after heating First solution (3) to 95° C., Blue dye-attached polyester fabric (1) (wherein the dye was Blue 79 and K/S value was 28.95) was immersed in First solution (3), wherein the weight ratio of Blue dye-attached polyester fabric (1) to First solution (3) was about 1:10. After stirring at 95° C. for 2 hours, the treated polyester fabric was isolated from First solution (3) and then washed with deionized water. After drying, Polyester fabric (9) was obtained.

K/S value of Polyester fabric (9) was determined by spectrophotometer (X-rite i1Pro, USA) and K/S value of Polyester fabric (9) was 10.13. The decolorization rate and intrinsic viscosity (IV value) of Polyester fabric (9) were determined, and the results are shown in Table 3.

intrinsic viscosity (IV value) of Polyester fabric (10) were determined, and the results are shown in Table 4.

Example 7

Example 7 was performed in the same manner as in Example 1 except that First solution (1) was replaced with First solution (4) (including 30 wt % of formic acid, 20 wt % of terephthalic acid, 0.1 wt % of potassium chlorate, and 49.9 wt % of water), obtaining Polyester fabric (11).

K/S value of Polyester fabric (11) was determined by spectrophotometer (X-rite i1Pro, USA) and K/S value of Polyester fabric (11) was 1.72. The decolorization rate and intrinsic viscosity (IV value) of Polyester fabric (11) were determined, and the results are shown in Table 4.

Comparative Example 5

Comparative Example 5 was performed in the same manner as in Example 1 except that First solution (1) was replaced with First solution (5) (including 10 wt % of sulfuric acid, 0.1 wt % of potassium chlorate and 89.9 wt % of water), obtaining Polyester fabric (12).

K/S value of Polyester fabric (12) was determined by spectrophotometer (X-rite i1Pro, USA) and K/S value of Polyester fabric (12) was 6.95. The decolorization rate and

TABLE 3

|  | first solution | second solution | dye | decolorization rate (%) | intrinsic viscosity (dL/g) |
| --- | --- | --- | --- | --- | --- |
| Example 5 | benzyltributylammonium chloride 0.3 wt %/sodium hydroxide 1 wt %/hydrogen peroxide 3 wt % | cresol 10 wt %/ propylene carbonate 10 wt %/ TritonX-100 0.1 wt % | Blue 79 | 90.5% | 0.57 |
| Comparative Example 4 | benzyltributylammonium chloride 0.3 wt %/sodium hydroxide 1 wt %/hydrogen peroxide 3 wt % | — | Blue 79 | 65% | 0.58 |

Comparative Example 4 merely uses the first solution to decolorize the blue polyester fabric. As shown in Table 2, the decolorization rate of the decolorized polyester fabric as disclosed in Comparative Example 4 is about 65%. In comparison with Comparative Example 4, the polyester fabric prepared from the two-stage decolorization method employing the first solution and second solution of the disclosure (i.e. polyester fabric of Example 5) has an obviously increased decolorization rate (more than 90%).

Example 6

Example 6 was performed in the same manner as in Example 1 except that First solution (1) was replaced with First solution (2) (including 45 wt % of formic acid, 1 wt % of sodium hypochlorite, and 54 wt % of water), and Second solution (1) was replaced with Second solution (5) (including 10 wt % of 1,3-butanediol, 10 wt % of propylene carbonate, and 80 wt % of water), obtaining Polyester fabric (10).

K/S value of Polyester fabric (10) was determined by spectrophotometer (X-rite i1Pro, USA) and K/S value of Polyester fabric (10) was 1.65. The decolorization rate and intrinsic viscosity (IV value) of Polyester fabric (12) were determined, and the results are shown in Table 4.

Comparative Example 6

First solution (6) was provided, wherein First solution (6) included 50 wt % of formic acid, 0.1 wt % of potassium chlorate, 10 wt % of cresol, 10 wt % of propylene carbonate, 0.1 wt % of Triton X-100, and 29.8 wt % of water. Next, after heating First solution (6) to 95° C., Blue dye-attached polyester fabric (1) (wherein the dye was Blue 79, and K/S value was 28.95) was immersed in First solution (6), wherein the weight ratio of Blue dye-attached polyester fabric (1) to First solution (6) was about 1:10. After stirring at 95° C. for 2 hours, the treated polyester fabric was isolated from First solution (6) and then washed with deionized water. After drying, Polyester fabric (13) was obtained.

K/S value of Polyester fabric (13) was determined by spectrophotometer (X-rite i1Pro, USA) and K/S value of Polyester fabric (13) was 11.58. The decolorization rate and intrinsic viscosity (IV value) of Polyester fabric (13) were determined, and the results are shown in Table 4.

TABLE 4

|  | first solution | second solution | dye | decolorization rate (%) | intrinsic viscosity (dL/g) |
| --- | --- | --- | --- | --- | --- |
| Example 6 | formic acid 45 wt %/ sodium hypochlorite 1 wt %% | butanediol 10 wt %/ propylene carbonate 10 wt % | Blue 79 | 94.3% | 0.58 |
| Example 7 | formic acid 30 wt %/ terephthalic acid 20 wt %/ potassium chlorate 0.1 wt % | cresol 10 wt %/ propylene carbonate 10 wt %/ TritonX-100 0.1 wt % | Blue 79 | 94.0% | 0.58 |
| Comparative Example 5 | sulfuric acid 10 wt %/potassium chlorate 0.1 wt % | cresol 10 wt %/propylene carbonate 10 wt %/TritonX-100 0.1 wt % | Blue 79 | 76% | 0.58 |
| Comparative Example 6 | formic acid 50 wt %/potassium chlorate 0.1 wt %/cresol 10 wt %/ propylene carbonate 10 wt %/ Triton X-100 0.1 wt % | — | Blue 79 | 60% | 0.58 |

Comparative Example 5 employed the aqueous solution (including sulfuric acid and potassium chlorate) to replace First solution (1) as disclosed in Example 1. As shown in Table 4, the decolorization rate of the decolorized polyester fabric as disclosed in Comparative Example 5 is about 76%. Comparative Example 6 employed First solution (6) to perform the decolorization of polyester fabric, wherein First solution (6) is prepared by mixing First solution (1) and Second solution (1). As shown in Table 4, the decolorization rate of the decolorized polyester fabric as disclosed in Comparative Example 6 is about 60%. In comparison with Comparative Examples 5 and 6, the polyester fabric prepared from the two-stage decolorization method employing the first solution and second solution of the disclosure (i.e. polyester fabric of Examples 6 and 7) has an obviously increased decolorization rate (more than 90%).

Accordingly, the method for decolorizing polyester fabric of the disclosure can effectively remove the dye attached to the polyester fabric without using pressurized equipment, achieve the purpose of deep decolorization of the polyester fabric, and improve the reusability of polyester fabrics.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A method for decolorizing polyester fabric, comprising:
providing a dye-attached polyester fabric;
immersing the dye-attached polyester fabric in a first solution, obtaining a treated polyester fabric, wherein the first solution comprises water, a first swelling agent and a solubility promoter, wherein the first swelling agent is $C_1$-$C_6$ aliphatic carboxylic acid, $C_7$-$C_{13}$ aromatic carboxylic acid, alkali metal hydroxide, alkaline earth metal hydroxide, or a combination thereof, and the solubility promoter is $R^1_4NCl$, peroxide, persulfate, cerium salt, chlorine-containing inorganic acid, chlorine-containing inorganic salt, or a combination thereof, wherein $R^1$ is independently $C_1$-$C_6$ alkyl group, phenyl group, benzyl group, or phenethyl group, and
immersing the treated polyester fabric in a second solution, obtaining a decolorized polyester fabric, wherein the second solution comprises water, a second swelling agent and an auxiliary swelling agent, wherein the second swelling agent is $C_3$-$C_8$ aliphatic alcohol, $C_4$-$C_8$ aliphatic ketone, $C_8$-$C_{16}$ aromatic ketone, $C_6$-$C_{10}$ phenolic compound, or a combination thereof, and the auxiliary swelling agent is ethylene carbonate, propylene carbonate, dimethyl acetamide, dimethyl formamide, dimethyl sulfoxide, ethyl acetate, tetrahydrofuran, dihydrolevoglucosenone, or a combination thereof.

2. The method for decolorizing polyester fabric as claimed in claim 1, wherein a concentration of the first swelling agent is 1 wt % to 60 wt %, based on a total weight of the first solution.

3. The method for decolorizing polyester fabric as claimed in claim 1, wherein a concentration of the solubility promoter is 0.1 wt % to 20 wt %, based on a total weight of the first solution.

4. The method for decolorizing polyester fabric as claimed in claim 1, wherein the dye-attached polyester fabric is immersed in the first solution at 80° C. to 120° C.

5. The method for decolorizing polyester fabric as claimed in claim 1, wherein the dye-attached polyester fabric is immersed in the first solution for 10 minutes to 4 hours.

6. The method for decolorizing polyester fabric as claimed in claim 1, wherein a concentration of the second swelling agent is 1 wt % to 30 wt %, based on a total weight of the second solution.

7. The method for decolorizing polyester fabric as claimed in claim 1, wherein a concentration of the auxiliary swelling agent is 1 wt % to 30 wt %, based on a total weight of the second solution.

8. The method for decolorizing polyester fabric as claimed in claim 1, wherein the treated polyester fabric is immersed in the second solution at 80° C. to 120° C.

9. The method for decolorizing polyester fabric as claimed in claim 1, wherein the treated polyester fabric is immersed in the second solution for 10 minutes to 4 hours.

10. The method for decolorizing polyester fabric as claimed in claim 1, wherein the first swelling agent is formic acid, acetic acid, propanoic acid, butyric acid, pentanoic acid, hexanoic acid, benzoic acid, toluic acid, cumic acid, 2,3-dimethylbenzoic acid, 3,5-dimethylbenzoic acid, phthalic acid, isophthalic acid, terephthalic acid, phenyl acetic acid, sodium hydroxide, potassium hydroxide, magnesium hydroxide, calcium hydroxide, or a combination thereof.

11. The method for decolorizing polyester fabric as claimed in claim 1, wherein the solubility promoter is tetrabutylammonium chloride, tetraethylammonium chloride, tetraethylammonium bromide, tetramethylammonium chloride, benzyltrimethylammonium chloride, benzyltriethylammonium chloride, benzyltripropylammonium chloride, benzyltributylammonium chloride, methyltripropylammonium chloride, methyltributylammonium chloride, methyltriethylammonium chloride, methyltriphenylammonium chloride, phenyltrimethylammonium chloride, hydrogen peroxide, benzoyl peroxide, tert-butyl hydroperoxide, tert-butyl peroxide, tert-butyl peroxybenzoate, cyclohexanone peroxide, sodium persulfate, potassium persulfate, ammonium persulfate, cerium nitrate, cerium acetylacetonate, cerium carbonate, cerium oxalate, cerium sulfate, chloric acid, chlorous acid, hypochlorous acid, perchloric acid, sodium chlorate, sodium chlorite, sodium hypochlorite, sodium perchlorate, sodium chlorate, sodium chlorite, sodium hypochlorite, potassium perchlorate, or a combination thereof.

12. The method for decolorizing polyester fabric as claimed in claim 1, wherein the second swelling agent is propanol, butanol, pentanol, hexanol, heptanol, octanol, nonanol, diethylene glycol, triethylene glycol, propanediol, butanediol, pentanediol, hexanetriol, acetone, butanone, pentanone, hexanone, cyclohexanone, methylcyclohexanone, heptanone, octanone, benzophenone, acetophenone, propiophenone, 3,4-dimethoxy-1-acetophenone, phenol, o-cresol, m-cresol, p-cresol, or a combination thereof.

13. The method for decolorizing polyester fabric as claimed in claim 1, wherein the decolorized polyester fabric has a decolorization rate of 90% to 99%.

* * * * *